United States Patent [19]
Lambing et al.

[11] Patent Number: 5,264,060
[45] Date of Patent: Nov. 23, 1993

[54] METHOD FOR PULTRUDING FIBER-REINFORCED THERMOPLASTIC STOCK

[75] Inventors: Cynthia L. T. Lambing, Apollo; John J. Barbus, Monroeville; Donald C. Miller, Ford City, all of Pa.

[73] Assignee: Aluminum Company of America, Pittsburgh, Pa.

[21] Appl. No.: 823,982

[22] Filed: Jan. 22, 1992

[51] Int. Cl.⁵ ............................................... B32B 31/26
[52] U.S. Cl. ..................... 156/180; 156/166; 156/242; 156/245; 156/324; 156/583.5; 156/308.2; 156/309.6
[58] Field of Search ............... 156/166, 180, 181, 245, 156/242, 441, 433, 583.5, 324, 580, 583.1, 583.3, 308.2, 309.6

[56] References Cited

U.S. PATENT DOCUMENTS

| | | |
|---|---|---|
| 3,383,266 | 5/1968 | Helm .......................... 156/324 X |
| 3,847,707 | 11/1974 | Meyer et al. . |
| 3,873,399 | 3/1975 | Goldsworthy et al. . |
| 4,164,439 | 8/1979 | Coonrod . |
| 4,380,523 | 4/1983 | Lind et al. ................... 156/174 |
| 4,440,593 | 4/1984 | Goldsworthy . |
| 4,445,951 | 5/1984 | Lind et al. .................. 156/309.6 |
| 4,622,192 | 11/1986 | Ma . |
| 4,820,366 | 4/1989 | Beever et al. ................ 156/180 X |
| 4,886,701 | 12/1989 | Eknert . |
| 5,057,175 | 10/1991 | Ashton ...................... 156/583.5 X |
| 5,114,516 | 5/1992 | Pilling et al. ................. 156/166 X |

FOREIGN PATENT DOCUMENTS

| | | | |
|---|---|---|---|
| 0125472 | 11/1984 | European Pat. Off. ............ 156/180 |
| 63-183836 | 7/1988 | Japan ................... 156/179 |
| 2113140 | 8/1983 | United Kingdom ................ 156/180 |

OTHER PUBLICATIONS

Beck, David E. "New Processes and Prospects in Pultrusion," 38th Annual Conference, Reinforced Plastics/Composites Institute, The Society of the Plastics Industry, Feb. 7-11, 1983, pp. 1-2.

*Primary Examiner*—Jeff H. Aftergut
*Attorney, Agent, or Firm*—Arnold B. Silverman; Gary P. Topolosky

[57] ABSTRACT

A method for making a fiber-reinforced resin sheet includes providing an array of a plurality of resin film layers and fiber layers, passing the array through a die in order to consolidate the array. A pair of belts which are interposed respectively between the upper surface of the array and the die and the lower surface of the array and the die and move through the die, preferably without substantial relative movement between the array and the belts is provided in order to facilitate efficient manufacture while preserving desired end product surface characteristics. The process is preferably a pultrusion process with the belts moving under the influence of pulling force applied to the array. Pultrusion apparatus employing such belts in the manufacture of fiber-reinforced resin sheet is also disclosed.

23 Claims, 5 Drawing Sheets

METHOD FOR PULTRUDING FIBER-REINFORCED THERMOPLASTIC STOCK

BACKGROUND OF THE INVENTION

1. Field of the Invention

This invention relates to a method and apparatus for pultruding fiber-reinforced, thermoplastic stock and, more specifically, it relates to such a system which is adapted to efficiently pultrude such stock made from thermoplastic resin film and provides means interposed between the array of dry reinforcing materials being formed and the die to maintain the desired surface quality of such reinforced thermoplastic resin stock.

2. Description of the Prior Art

The beneficial use of composite materials composed of a resinous material reinforced with a fiber has long been known. Such materials are frequently desirable in terms of their strength-to-weight and stiffness-to-weight characteristics, as well as corrosion resistance. They also have other desirable properties such as improved damage tolerance, reduced life cycle cost, and custom design flexibility through anisotropy.

Among the industries wherein such composite materials have found substantial use are the aerospace and transportation industries. While both thermosetting and thermoplastic resins are available for use in fiber reinforced composites, the majority of composites fabricated today employ thermosetting resins. These thermosetting materials generally require long processing cycles for the reaction kinetics to occur and in some cases require a lengthy post-cure. All of this results in increased part costs. Also, thermosetting materials have limited shelf life and require refrigeration and monitoring to ensure that the kinetics do not advance too far prior to fabrication of the product.

By contrast, thermoplastic polymers are limited in processing time solely by the rates of melting, consolidation and cooling. A major limitation to the use of thermoplastics in reinforced composites is their high melting viscosities which are in the order of about $10^5$ to $10^6$ cP as compared with $10^2$ to $10^3$ cP for thermosetting material. These higher thermoplastic viscosities tend to lead to complications in fiber wet-out and void removal which are critical properties. While it has been known to employ solvents to reduce thermoplastic polymer viscosities, in-process removal, collection, disposal and-/or recycling add to the cost of thermoplastic manufacturing processes. Also, most solvents are considered potentially hazardous to the environment and to human health. In spite of these advantages of thermoplastics, there remains a substantial need to provide an economical means of effectively producing fiber-reinforced thermoplastic resin materials.

U.S. Pat. No. 4,164,439 discloses a method of making fiber-reinforced plastic grates out of reinforcing fiber and thermosetting plastic resins. This method involves the use of tooth containing belts around which the fibers are wrapped. A pair of adjacent belts orbit in opposite directions and are stationary for a two minute period during the molding operation.

U.S. Pat. No. 4,440,593 is directed toward creating by the pultrusion process reinforced plastic composite articles by the use of curved dies. In the embodiment illustrated in FIGS. 13 through 16 a belt-like die member is urged into cooperation with another belt member by a plurality of rollers to create a die chamber therebetween. See also the curved pultrusion system of U.S. Pat. No. 3,873,399 wherein reinforced plastic articles of arcuate shape are created. A pair of driven belts are employed as a means for pulling the composite through the downstream die elements.

U.S. Pat. No. 3,847,707 discloses a dual doctor blade system wherein the blades serve to coat and control the reinforcing fiber. Reference is made to predominant use of thermosetting resins. The exterior film portions are provided from opposite sides of the fibers and are urged into intimate contact to form the exterior plies of the product.

U.S. Pat. No. 4,886,701 discloses providing a blend of glass fibers and binder powder, compacting the same and then delivering it by conveyor means, which may be a belt, to a compacting station where heat may be provided to create an intermediate product. A press belt may be used.

U.S. Pat. No. 4,622,192 discloses a glass/carbon fiber composite using a polyolefin. It discloses the use of heated steel belts with the laminate being compressed by pressure rolls.

Copending U.S. patent application Ser. No. 593,185 owned by the assignee of the present application discloses the use of pultrusion to create a fiber-reinforced thermoplastic stock without having to draw the fiber-reinforcements through a resin bath prior to entry into the die. Means for maintaining a pool of thermoplastic are provided at or near the die entrance.

In spite of the foregoing disclosures there remains a real and substantial need for a method and apparatus for creating fiber-reinforced thermoplastic composites by the pultrusion method in a rapid and economical manner so as to permit thermoplastics to have greater use in fiber-reinforced composite products.

SUMMARY OF THE INVENTION

The present invention provides a method of making a fiber-reinforced resin sheet which includes an array, having a plurality of resin film layers with a plurality of interposed fiber layers, passing the array through die means having an entrance and an exit in order to heat, consolidate and cool the array as it passes through the die means, interposing a first belt means between the upper surface of the array and the die means and interposing a second belt means between the lower surface of the array and the die means and moving the first and second belt means with said array as it passes through the die means. The belt means are preferably endless belt means which are mounted on either spools or rolls intended solely for tension and guidance. As used herein, the expression "belt means" shall refer to a portion of the apparatus and not to a component of the resin sheet.

The apparatus for thermoplastic pultrusion in the context of the present invention has die means for heating, consolidating and cooling an array of resin films and fiber reinforcement materials. First and second belt means pass through the die means in a relatively interposed position with respect to the array.

It is an object of the present invention to provide a method and apparatus for the economic manufacture of thermoplastic fiber-reinforced composite resins by pultrusion.

It is a further object of the present invention to provide such a system which will produce high quality composites of this type in a rapid and economical fashion.

It is a further object of the present invention to provide such a system which will permit the thermoplastic resin materials positioned on the upper and lower surfaces of the composite to have desirable high quality surface integrity and appearance.

It is a further object of the present invention to provide such a system which permits the production of such composites which have acceptable or superior wet-out and void characteristics.

It is a further object of the present invention to provide such a system which resists tearing and stripping off of the surface layers of the resin film by minimizing the shear forces between such layers and the stationary die surfaces.

It is a further object of the present invention to provide such a system which employs film stacked pultrusion having belt means in intimate contact with the fiber-resin array during passage through the die which melts, consolidates and cools the array to produce the desired composite material.

These and other objects of the invention will be more fully understood from the following description of the invention on reference to the illustrations appended hereto.

DESCRIPTION OF THE PREFERRED EMBODIMENTS

It will be appreciated that the present invention may be employed with various types of thermoplastic resinous materials and reinforcing materials presented to the dies of various forms and that the choice of materials of construction are not limiting upon the invention.

In a preferred form of the invention, the composite materials will be fabricated by film stacking thermoplastic pultrusion which may employ "prepreg" materials, i.e. materials in which a resin film matrix which has impregnated therein a layer of elongated fiber members oriented generally in the direction of flow of the material through the dies.

In a preferred practice of the invention the upper and lower layers of the composite may be prepreg and the interior plies may be alternating plies of resin film and fiber which is of less expensive materials than the prepreg. In lieu of the prepreg, the commingled or cowoven fibers may be employed in the uppermost and lowermost fiber layers. For simplicity of reference herein the construction will be described as having an uppermost and lowermost resin film layer with an inwardly adjacent fiber layer but such term may be deemed to embrace prepreg materials. If desired, prepreg or commingled or cowoven fibers may be employed in additional portions of the stack, if desired. Also, depending upon the desired product and economic considerations, various combinations of fiber layers may be employed with a composite.

Figure 1:
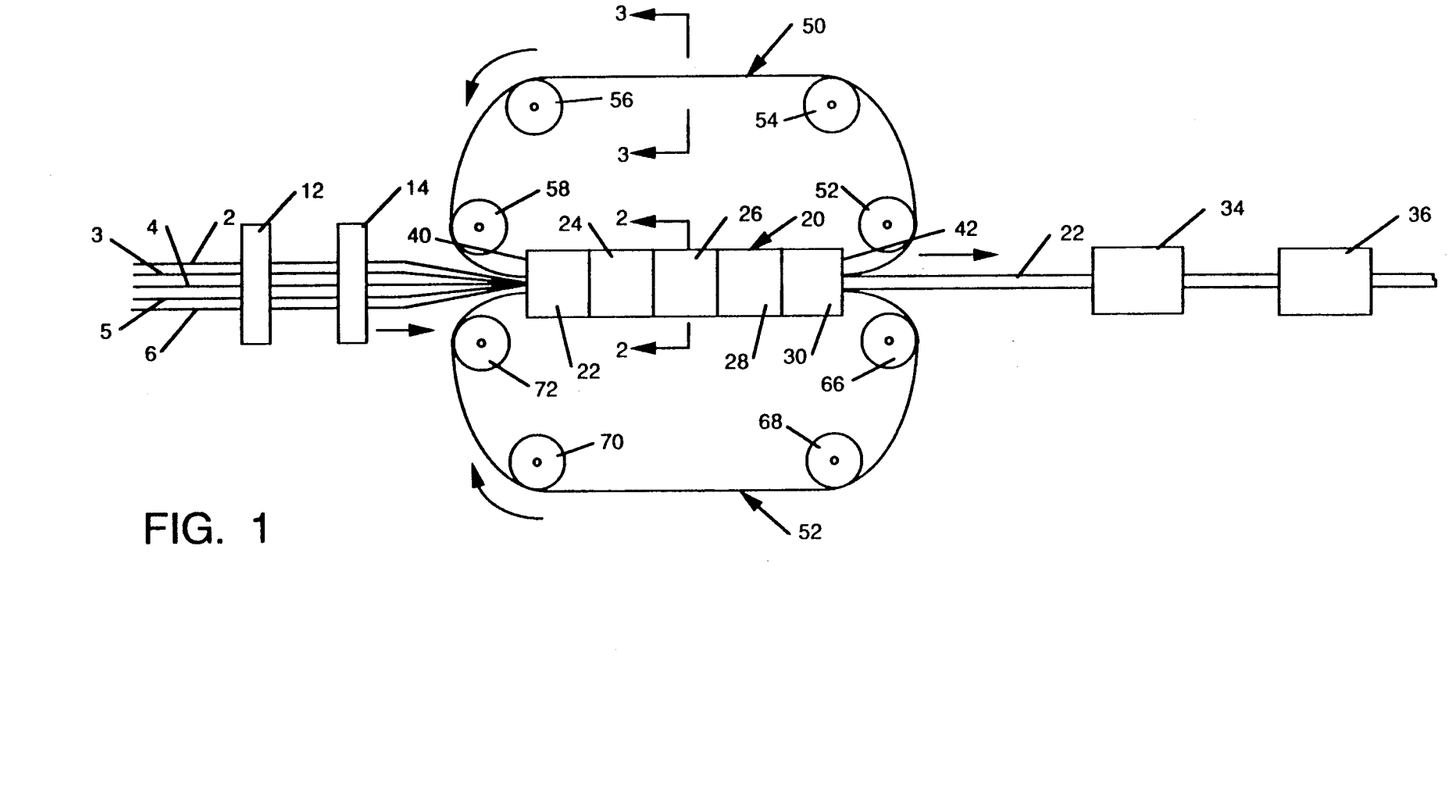
FIG. 1 is a schematic elevational illustration of a major portion of a pultrusion system of the present invention.

As shown in FIG. 1, several separate plies of resin film 2, 4, 6 between which will be disposed layers of elongated fibers 3, 5 which are preferably disposed in spaced relationship from the upper and lower surfaces respectively of the upper resin film 2 and the lower resin film 6 resin film. These may be provided from any conventional source of supply.

They pass through openings in a set of spaced infeed cards. The fibers move into the die 20 which in the form shown is stationary and consists of a number of adjacent die sections 22, 24, 26, 28 and 30 which are positioned so as to function as a single unit. The resultant product 22 emerges in a direction indicated by the arrow. The thermoplastic resin film 2, 4, 6 and interposed layers of fibers 3, 5 and the resultant product 22 are moved through the die 20 in the pultrusion process under the influence of grippers 34 and 36 which may be of a conventional form. After the formed stock 22 passes through the grippers, it may be severed into segments of desired size by means of a cutoff saw (not shown) which may be of a conventional variety. The die means 20 has an entry 40 and an exit 42.

Referring still to FIG. 1, there is shown a pair of endless belts 50, 52 which orbit, respectively, in a counter-clockwise and clockwise directions. Belt 50 is supported by a plurality of spools 52, 54, 56, 58 which in the form shown are spaced from each other and rotate about axes that are parallel to each other. In another advantageous aspect of the present invention, the spools 52, 54, 56, 58 need not be power driven, but rather rotate under the influence of the orbiting belt 50 which is moved along with the material as a result of the pulling influence of grippers 34, 36. Similarly, belt 52 is supported by spools 66, 68, 70, 72 which also may be idler spools. It will be noted that in the forms shown, belts 50, 52 are endless belt means which enter the die at entry 40. Belt 50 is being interposed between the upper surface of the array of materials 2, 4, 6 and the adjacent die surface. Belt 52 enters at die entry 40 between the lower surface of the material array 2, 4, 6 and the adjacent die surface. It will be appreciated that in the preferred embodiment of the invention, there will be no substantial relative movement between the upper surface of array element 2 and belt 50 or between the lower surface of array element 6 and the adjacent surface of belt 52.

The die section 22 preferably has heater means (not shown) which serve to elevate the resin to a temperature of less than about 50° F. to 100° F. degrees below the melting point of the thermoplastic resin so as to permit softening of the material for the consolidation stage while not permitting free flowing as would occur were the material melted. In die sections 24, 26, 28 consolidation of the array 2, 3, 4, 5, 6 occurs by progressive compression so as to establish a unitary composite within die 20 in the direction of motion of the material which, in pultrusion, is designated as "upstream." A cooling zone is provided within die section 30 to cool the resultant product to a temperature at least 50° F. to 100° F. below the melting point of the resin.

Figure 2:
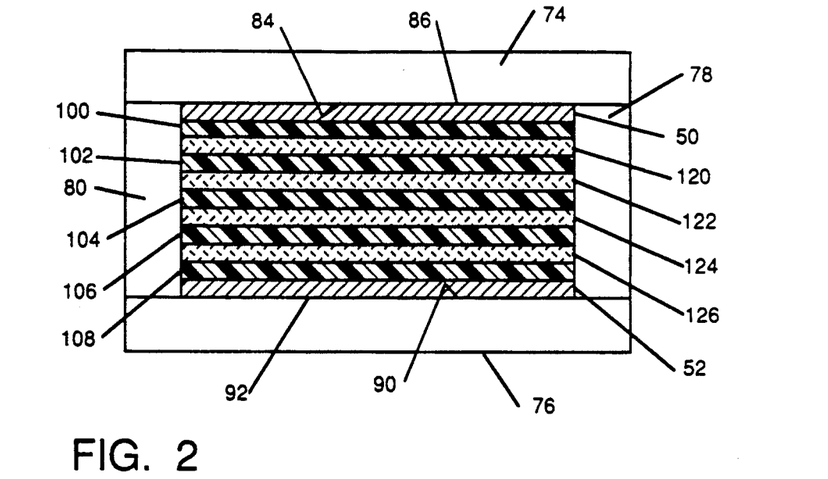
FIG. 2 is a modified cross-sectional illustration taken through 2—2 of FIG. 1 showing the array passing through the die means interior.

FIG. 2 is a cross-section of the die means 20 within section 26 during the consolidation phase but shows the use of additional layers of film and fiber. The die has an upper wall 74, a lower wall 76 and a pair of adjacent relatively spaced walls 78, 80 which define the die chamber through which the array being consolidated passes. Upper die wall 74 has an inner surface 84 which is in intimate surface-to-surface contact with upper surface 86 of belt 50. Similarly, lower die wall 76 has an inner surface 90 which is in intimate surface-to-surface contact with the lower surface 92 of belt 52. The array in the form illustrated has alternating resin layers 100, 102, 104, 106, 108 and fiber layers 120, 122, 124, 126. It will be understood that still other non-alternating array configurations may be employed with this die, such as with multiple layers of resin or two or more layers of fiber (or different fiber layers) being adjacent to one another in the same array. Also different resins and different fibers may be employed in different layers of the same array, and, if desired, the thicknesses of different layers may be varied.

As a result of the belts 50, 52 moving through the die interior passageway along with the array, there is no substantial relative movement between the two belts 50, 52 and the array. The layers 100, 108 of the resin which are being pulled through the die under the influence of gripper means 34, 36 are not subjected to shear forces, frictional forces or other potentially damaging contact with stationary die surfaces 84, 90, but rather merely move along with the interposed belt elements serving as a protective means.

While for convenience of reference herein, only three webs of material of resin film 2, 4, 6 have been shown in FIG. 1. It will be appreciated that any number may be employed such as, for example, the number needed to produce the product shown in FIG. 2.

The fiber layers 120, 122, 124, 126 may take the form of a fiber mat, unidirectional tow, stitched material, stitched ply sets or other reinforcing mat, which may be generally coextensive with said array.

Figure 3:
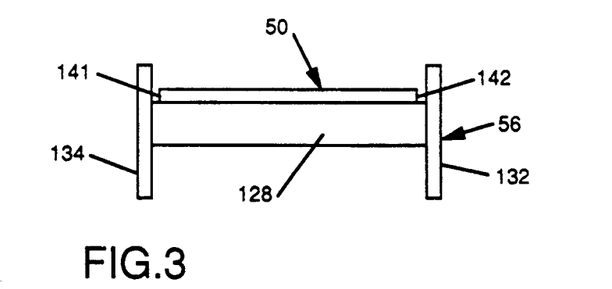
FIG. 3 is a cross-sectional illustration taken through 3—3 of FIG. 1 showing a portion of the belt support.

FIG. 3 shows a supported relationship between belt 50 and a supporting rotatably-mounted spool 56. It will be noted that the spool has a core portion 128 and a pair of flanges 132, 134 which serve to confine the belt 50 for movement within the desired path. The distance between the belt edges 141, 142 and the interior surfaces of the flanges 134, 136 is preferably kept at a minimum in order to resist undesired relative lateral movement between the belt 50 and spool 56. It is also preferred that the belt have a lateral width generally equal to or slightly greater than the width of the array materials 2, 3, 4, 5, 6.

Figure 4:
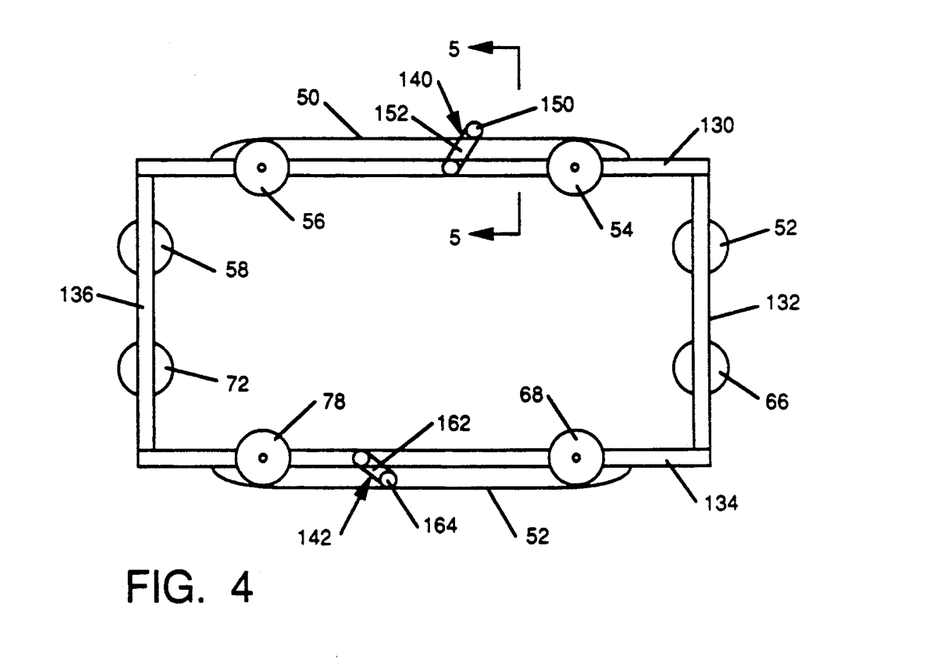
FIG. 4 is a schematic elevational view, showing the frames for supporting the rollers or spools and the tensioning means.

FIG. 4 illustrates an elevational view of one side of a frame that may be used to support the spools or roller members. The frames as shown in FIG. 4 may take the form of a plurality of fixedly secured, generally L-shaped members 130, 132, 134, 136 which form a frame-like member to which each of the spools are rotatably secured. A mirror-image of the frame (not shown) is positioned on the opposite side of the spools.

Figure 5:
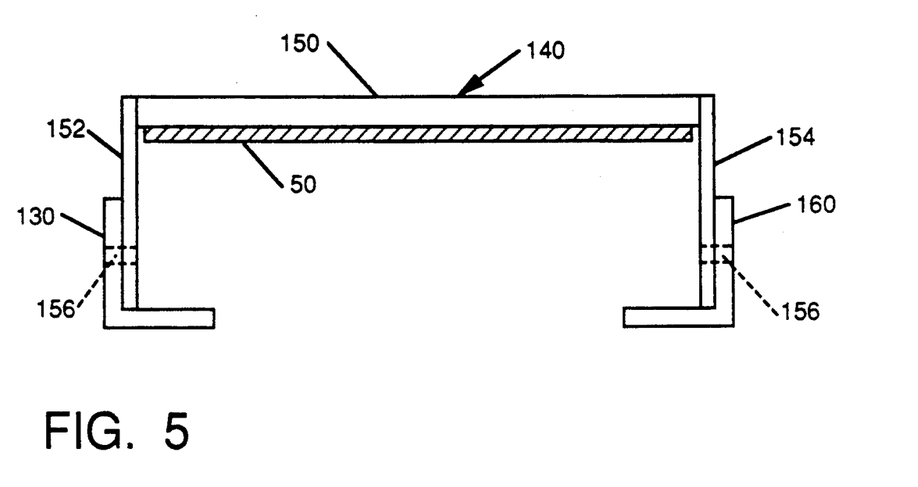
FIG. 5 is an elevational view of cross-sectional illustration of the tensioning means taken through 5—5 of FIG. 4.

A further feature of the invention is illustrated with reference to FIGS. 4 and 5. Tension arms 140, 142 are employed so as to maintain the desired tension in the belt 50, 52. Referring first to arm 140, it has a transverse element 150 with a pair of depending leg portions 152, 154 which are rotatably secured by any suitable fastener members 156, 158 to generally L-shaped framing members 130, 160. The belt tensioning member 140 shown in FIG. 4 has its transverse element 150 in the form of a generally cylindrical member which rests on the outer surface of belt 50. Similarly, lower tension member 142 is pivotally secured to frame 134 and its counterpart frame at the other end of the tensioning member (not shown) and has an arm 162 terminating in contacting member 164 which contacts the inner surface of belt 52.

Figure 6:
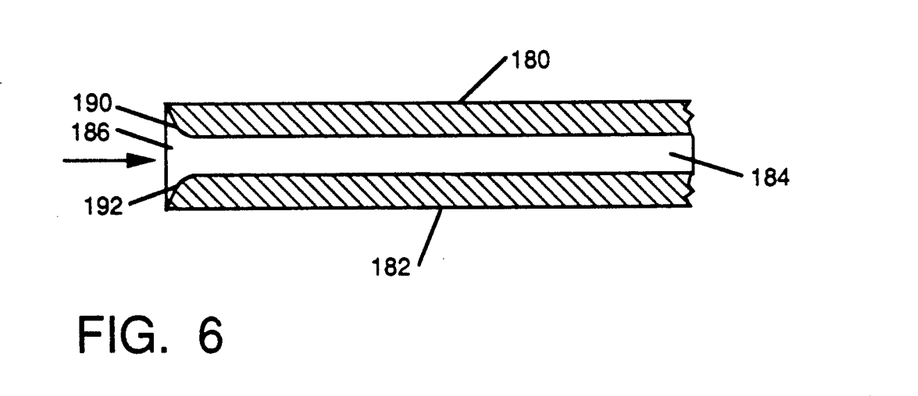
FIG. 6 is a fragmentary illustration of the die means showing the entry area.

For convenience of reference, a plurality of die segments 22, 24, 26, 28, 30 have been employed to facilitate flexibility in the various stages of stack formation. It will be appreciated that the invention is not so limited and there may be a single die chamber with or without multiple heating zones, if desired. Regardless of whether such a unitary die or a multi-segment die is employed, it is preferable to have a die which has an inwardly converging throat so as to facilitate smooth entry of the two belts and the array of materials into the die. Referring to FIG. 6, there is shown a die element having an upper wall 180, a lower wall 182 which cooperates with a pair of lateral walls (not shown) to define a die chamber 184 which has an entry area 186. Each of the die members 180, 182 have end surfaces 190, 192 which are oriented generally angularly inwardly toward the longitudinal axis of the die chamber 184 and have a generally radially inwardly convex curved transition between the end walls 190, 192 and the inner surfaces of die elements 180, 182.

While it will be appreciated that a wide range of thermoplastic materials may be employed in making composites by the system of the present invention, among the presently preferred materials are one or more materials selected from the group consisting of polyetheretherketone (PEEK), polyetherimide (PEI), polyphenylenesulfide (PPS), polyethersulfone (PES), polyarylethersulfone (available under the trade designation Radel X), polyarylenesulfide (PAS), polysulfone (PSO), and polyarylsulfone (available under the trade designation Radel A). The resin film layers preferably have a film thickness of about 5 to 10 mils, although within a given array not all of the films need to have the same thickness. Where it is desired to have greater pressure for consolidation provided by the die means the thickness of one or more of the resin film layers may be increased.

The fiber means may be any suitable material. Among the currently preferred materials are one or more fibers selected from the group consisting of glass, carbon and aramide. Another suitable material is polyethylene such as that sold under the trade designation Spectra 64 Allied Signal Technologies. This product is an extended cham, high modulus polyethylene fiber having a molecular weight of about 1 to 5 million and a tensile strength of at least about 375 KPSI.

It will be appreciated that depending upon the desired properties in the final product and economic considerations, the thermoplastic material which may be selected from a wide variety of thermoplastic materials may be employed in various combinations with fibers made of different materials.

The first belt means 50 and second belt means 52 are preferably composed of a material that will be sufficiently durable, will intimately engage the resin film exposed surfaces and resist relative movement therebetween without damages to or undesired imprinting of the same. If desired, however, one or both belts could be positioned to imprint the opposite impression of the belt face onto the adjacent contacting resin surfaces as pultrusion is occurring. Among the preferred materials for use in the belt are materials such as the material stainless steel of a thickness of about 0.005 to 0.015 inch, nickel, monel polyimide and combinations thereof. A suitable polyimide is that sold under the trade designation Upilex by ICI America's Inc. Upilex is a polyimide film which is characterized by good high temperature mechanical properties, a low rate of moisture permeability and excellent chemical resistance. The belt if composed of Upilex preferably may have a thickness of about 5 to 15 mils. The belt should have a width at least slightly greater than the array which will be manufactured so as to provide intimate and substantially continuous surface-to-surface engagement between the belt and upper and lower exposed resin film portions of the array.

In order to resist undesired sticking of the belt to either the dies or the exposed upper and lower resin array surfaces, a lubricant material such as the materials sold under the trade designations Teflon and Frekote 44, for example, may be further applied to such surfaces as by spraying.

It is generally desired to have the product emerge from the die means 20 at a rate of about 0.1 to 4 feet per minute.

EXAMPLE

In order to provide more details regarding the specific preferred practices of the invention, an example will be provided.

It is generally preferred to have the fiber content of the pultrusion be about 60 to 85% on a weight percent basis and the resin content be about 15 to 40% on a weight basis with the void content preferably less than about 2 volumetric percent.

The pultrusion system of the present invention was tested on a 20,000 pound pull force capacity pultrusion machine. A steel die measured 6.5×0.060×16.5 inch and was designed to allow melting, consolidation and solidification of the thermoplastic composites. Multiple segments were employed in the die in order to allow for changing the cross-sectional areas. Electrical resistance heating cartridges were used in order to provide more accurate and efficient temperature control capability. Control of the temperature of the exit die is important as excessive temperatures can cause undesired delineation and surface imperfections to occur. The pultrusion die consolidation temperature for the first resin, which was a polyetheretherketone which is a semi-crystalline resin with a transition temperature of 143° C. (290° F.) was employed as one matrix and the second resin was polyetherimide which is a material having a glass transition temperature of 219° C. (427° F.). Each resin was employed with glass fiber reinforcement and also with carbon fiber reinforcement. The consolidation temperatures for the polyetheretherketone and glass film stack material was about 316° C.-385° C. (600° F.-725° F.) and for the polyetheretherketone-carbon film stacked was about 321° C.-371° C. (610° F.-700° F.). The polyetherimide glass film stacked at consolidation temperature of about 219° C.-288° C. (425° F.-550° F.). The polyetheretherketone films were employed in 5 mil and 10 mil thicknesses and 0/90° glass fabric was provided in 15 mil thicknesses. Three plies of fabric were alternated with four plies of the resin film and pulled through a polyethylene in-feed alignment card. Ten mil film was placed on the top and bottom of the stack and the 5 mil film between fabric plies. The resultant materials were compared with film stacked laminates consolidated in the press which was a 2×2 foot, 150 ton press. In comparing the polyetheretherketone/carbon or glass composite with the corresponding press molded material, it was found that the film stacked pultruded product, both in terms of weight percent, fiber content and resin content and void volume percent produced acceptable values.

Figure 7:
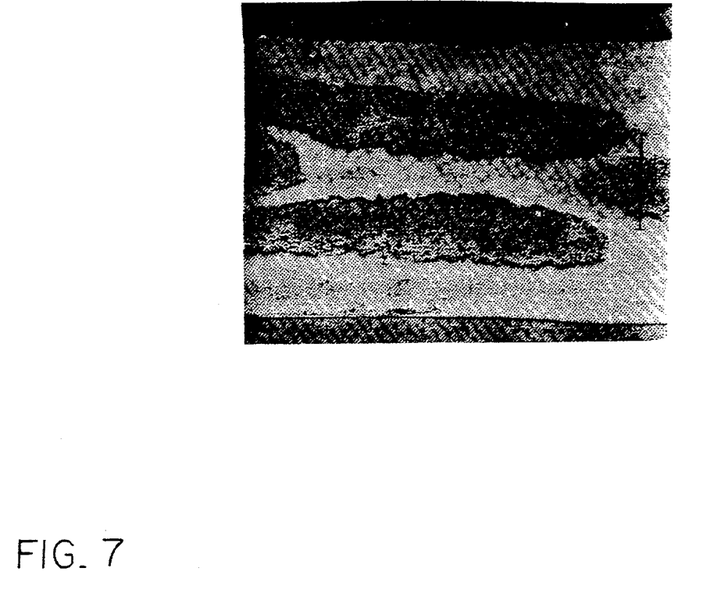
FIGS. 7 through 10 are micrographs of pultruded film stacked fiber reinforced composites made by the present invention.
Figure 8:
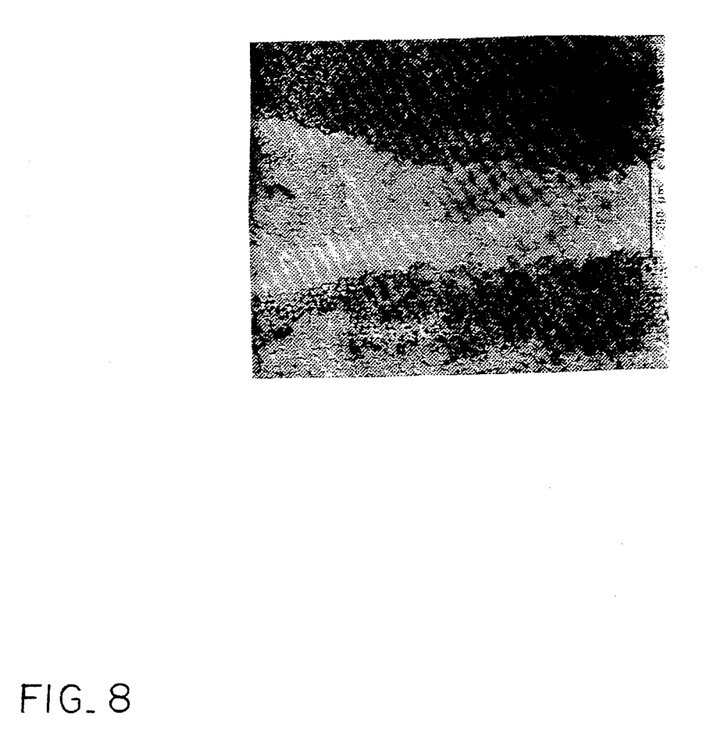
Figure 9:
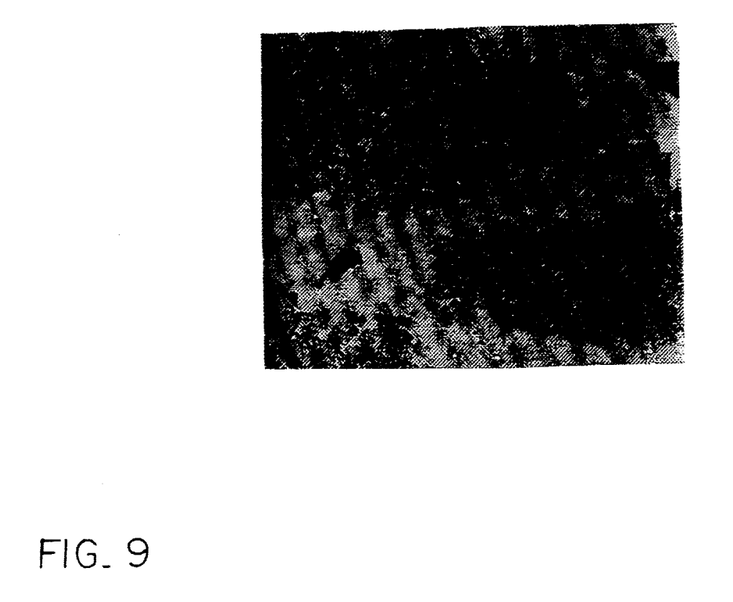
Figure 10:
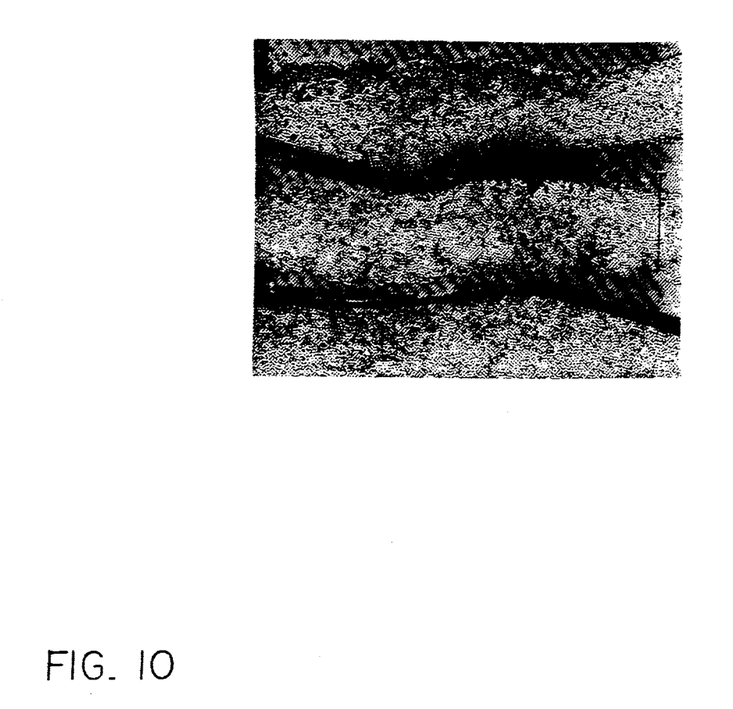

FIGS. 7 and 8 are micrographs of a pultruded film stacked fiber reinforced thermoplastic resin material made by the present invention. Polyetherimide (PEI) resin was employed with glass fiber (0°). FIG. 7 is a 50× enlargement and FIG. 8 is a 100× enlargement. These composites show the desired void content and wet-out of the reinforcing fiber bundles. Similarly, FIG. 9 is a 100× enlargement of a pultruded film stacked fiber reinforced thermoplastic resin material made from polyetheretherketone (PEEK) and glass fiber (0°). This shows desired resin wet-out and limited small voids. Finally, FIG. 10 shows a 100× enlargement of a PEEK/carbon fiber (0°) material with less desirable wet-out and void characteristics.

By providing a chamfer in the die entrance such as illustrated in FIG. 6, further improvement in these characteristics are believed to be obtainable.

It will be appreciated, therefore, that the method and apparatus of the present provides an effective means for employing thermoplastic resin materials in producing fiber-reinforced resin composites in an economical way, while resisting undesired damage to the exposed surfaces of the upper and lower resin layers.

While for convenience of reference herein, the final product has been shown as having planar upper and lower surfaces, the invention is not so limited and non-planar upper and lower surfaces such as curved surfaces, if desired, may be created.

While the preferred use of an endless belt has been disclosed specifically herein, the invention is not so limited and the use of other belts such as a belt having ends supported on a pair of rotatable supply and take-up reels may be employed.

While for convenience of reference, the preferred type of spool has been disclosed, it will be appreciated that other forms of roller means may be employed, if desired.

Whereas particular embodiments of the invention have been described above for purposes of illustration, it will be evident of those skilled in the art that numerous variations of the details may be made without departing from the invention as defined in the appended claims.

We claim:
1. A method of making a fiber-reinforced resin sheet comprising
   providing an array having a plurality of resin film layers and a plurality of fiber layers,
   substantially continuously passing said array through stationary die means having an entrance and an exit,
   interposing first belt means between the upper surface of said array and said die means,
   interposing second belt means between the lower surface of said array and said die means,
   moving said first belt means and second belt means with said array as it passes through said die means,
   heating said resin film layers to a temperature of less than about 50° F. to 100° F. below said resin film layers' melting point, consolidating said array as it passes through said die means to create said fiber-reinforced resin sheet, and cooling said consolidated array.

2. The method of claim 1 including effecting said movement of said first belt means and said second belt means through said die means without substantial relative movement between said array and said first and second belt means within said die means, and maintaining substantially continuous surface-to-surface engagement between said first and second belt means and upper and lower exposed resin film portions, respectively, during said movement through said die means.

3. The method of claim 2 including supporting at least a portion of said first belt means and said second belt means on spool means.

4. The method of claim 2 including maintaining said array in intimate surface-to-surface contact with said first belt means and said second belt means as said array moves through said die means.

5. The method of claim 4 including heating said array adjacent to said entrance of said die means, compressing said heated array with said die means as said array moves through said die means, and cooling said compressed array adjacent to said die means exit.

6. The method of claim 5 including employing as said die means a unitary die established by a plurality of closely adjacent stationary die sections for progressive compressing of said array as said array moves through said die means.

7. The method of claim 6 including employing a thermoplastic resin as said resin film.

8. The method of claim 7 including selective said resin one or more materials selected from the group consisting of polyetheretherketone, polyetherimide, polyphenylenesulfide, polyethersulfone, polyarylethersulfone, polyarylenesulfide, polysulfone and polyarylsulfone.

9. The method of claim 7 including employing as said fiber layers one or more materials selected from the group consisting of glass, carbon, aramide and polyethylene.

10. The method of claim 1 wherein said fiber reinforced resin sheet is generally planar.

11. The method of claim 3 including employing as said first and second belt means belts made of material selected from the group consisting of stainless steel, nickel, monel polyimide and combinations thereof.

12. The method of claim 11 including substantially continuously applying a lubricant on at least some of the surfaces of said first and second belt means.

13. The method of claim 12 including maintaining desired tension on said first and second belt means.

14. The method of claim 2 including employing pultrusion means to pull said array through die means.

15. The method of claim 14 including effecting orbital movement of said first belt means and said second belt means by the pulling force applied to said array by said pultrusion means.

16. The method of claim 15 including employing said first belt means and second belt means with a width at least equal to the width of said array.

17. The method of claim 15 including creating said array with resin film providing the upper surface and the lower surface of said array.

18. The method of claim 7 including continuously moving said array out of said die means at a rate of about 0.1 to 4 feet per minute.

19. The method of claim 2 including employing endless belt means as said first and second belt means.

20. A method of pultruding a fiber reinforced resin sheet comprising providing an array having a plurality of thermoplastic resin film layers and a plurality of fiber layers, substantially continuously pulling said array through stationary die means wherein said resin film layers are heated to a temperature of less than about 50° F. to 100° F. below the resin film layers' melting point and said array is consolidated, providing first belt means between an upper surface of said array and an adjacent die means surface, providing second belt means between the lower surface of said array and an adjacent die means surface, and moving said first and second belt means through said die means without substantial movement between said array and said first and second belt means.

21. The method of claim 20 including establishing said array with said resin layers providing the upper and lower layers and said fiber and additional resin film layers alternating therebetween, and maintaining substantially continuous surface-to-surface engagement between said first and second belt means and said upper and lower layers, respectively, during said movement through said die means.

22. The method of claim 20 including employing endless belt means as said first and said second belt means.

23. The method of claim 21 including continuously moving said array out of said die means at a rate of about 0.1 to 4 feet per minute.

* * * * *